United States Patent
Langereis et al.

(10) Patent No.: US 10,342,015 B2
(45) Date of Patent: Jul. 2, 2019

(54) SCHEDULING FOR HALF-DUPLEX USER EQUIPMENT

(71) Applicant: TELEFONAKTIEBOLAGET LM ERICSSON (PUBL), Stockholm (SE)

(72) Inventors: Alexander Langereis, Sigtuna (SE); Prabaharan Kanesalingam, Ottawa (CA); Björn Nordström, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/754,204

(22) PCT Filed: Aug. 19, 2016

(86) PCT No.: PCT/SE2016/050772
§ 371 (c)(1),
(2) Date: Feb. 21, 2018

(87) PCT Pub. No.: WO2017/034454
PCT Pub. Date: Mar. 2, 2017

(65) Prior Publication Data
US 2018/0255549 A1    Sep. 6, 2018

Related U.S. Application Data

(60) Provisional application No. 62/208,033, filed on Aug. 21, 2015.

(51) Int. Cl.
*H04W 72/04* (2009.01)
*H04L 5/16* (2006.01)
*H04W 72/12* (2009.01)

(52) U.S. Cl.
CPC .......... *H04W 72/0446* (2013.01); *H04L 5/16* (2013.01); *H04W 72/042* (2013.01); *H04W 72/0453* (2013.01); *H04W 72/1257* (2013.01); *H04W 72/1289* (2013.01)

(58) Field of Classification Search
None
See application file for complete search history.

(56) References Cited

U.S. PATENT DOCUMENTS

| | | | | |
|---|---|---|---|---|
| 9,419,762 B2* | 8/2016 | Yang | ..................... | H04B 7/2656 |
| 2009/0296609 A1* | 12/2009 | Choi | ................... | H04W 72/121 |
| | | | | 370/281 |
| 2013/0250772 A1* | 9/2013 | Yin | ....................... | H04L 1/1822 |
| | | | | 370/241 |

(Continued)

OTHER PUBLICATIONS

Ericsson, "Subframe timing conflict in half-duplex FDD", 3GPP Draft; R1-142374, May 18, 2014.

(Continued)

*Primary Examiner* — Michael J Moore, Jr.

(57) ABSTRACT

A network node identifies a fixed periodic pattern to be used for scheduling a half-duplex (HD) user equipment (UE), the fixed periodic pattern defining a sequence of at least one downlink (DL) subframe, then at least one guard period, and then at least one uplink (UL) subframe. The network node then performs DL assignments for the network node according to the fixed periodic pattern and transmits UL grants to the UE according to the fixed periodic pattern.

15 Claims, 11 Drawing Sheets

(56) References Cited

U.S. PATENT DOCUMENTS

| | | | |
|---|---|---|---|
| 2015/0030090 A1* | 1/2015 | You | H04L 5/14 |
| | | | 375/260 |
| 2016/0219583 A1* | 7/2016 | Blankenship | H04W 72/1205 |
| 2016/0254901 A1* | 9/2016 | You | H04J 1/16 |
| | | | 370/281 |
| 2017/0034850 A1* | 2/2017 | Rico Alvarino | H04W 4/70 |

OTHER PUBLICATIONS

Samsung, "Multi-Subframe Scheduling and UE-Group Scheduling for Low Cost UEs", 3GPP Draft; R1-151585, Apr. 19, 2015.
RAN WG1, "LS on half-duplex FDD operation for low-complexity MTC UEs", 3GPP Draft; R4-145484, Aug. 24, 2014.

* cited by examiner

SCHEDULING FOR HALF-DUPLEX USER EQUIPMENT

CROSS-REFERENCE TO RELATED APPLICATIONS

This application is a national stage application of international application No. PCT/SE2016/050772, filed Aug. 19, 2016, which claims priority to U.S. Patent Application No. 62/208,033 filed on Aug. 21, 2015, the disclosure of which are hereby incorporated by references in their entireties.

TECHNICAL FIELD

The disclosed subject matter relates generally to communication systems and, and more particularly to communication systems operating in half-duplex (HD) mode.

BACKGROUND

There are currently many radio/wireless and cellular access technologies and standards such as Global System for Mobile Communications/General Packet Radio Service (GSM/GPRS), Wideband Code Division Multiple Access/ High Speed Packet Access (WCDMA/HSPA), CDMA-based technologies, wireless fidelity (WiFi), Worldwide Interoperability for Microwave Access (WiMAX) and Long Term Evolution (LTE), to name but a few. Numerous technologies and standards have been developed during the last few decades, and it can be expected that similar developments will continue into the future. Specifications are developed in a variety of organizations such as the $3^{rd}$ Generation Partnership Project (3GPP), 3GPP2 and IEEE.

Communication between network nodes such as base stations and user equipment may be based on standardization, standard protocols and standard specifications, allowing the parties to the communication to interact appropriately. There are some scenarios, however, where a UE or network node operates in ways that are not defined by standard. Some UEs, for example, have performance limitations that prevent them from implementing all of the features required by a standard.

As an example, Category 0 UEs may have certain performance limitations because they may be equipped with only one receive antenna and/or because they may be limited to half-duplex operation. When such a UE enters an LTE network, an early task is to determine whether the network is capable of supporting such UEs. To support such UEs, the network is generally required to provide good coverage (e.g., via power boosting), since reception capabilities of these UEs may be relatively limited. Category 0 devices are defined in 3GPP Release 12, and they can optionally support HD Type B and can be produced with lower costs than other LTE UE categories. Release 13 defines category M UEs which will in most cases require HD operation.

In general, a duplex communication system is one that supports point-to-point communication between two parties in both directions. In a full-duplex (FD) communication system, the communication may occur in both directions at the same time, and in a half-duplex (HD) communication system, the communication may occur in only one direction at a time.

FD and HD operations are typically implemented using either time-division duplexing (TDD) or frequency division duplexing (FDD). In TDD, outward and return signals are communicated on the same carrier frequency, but at different times (e.g., in different time slots or non-overlapping subframes). In FDD, outward and return signals are communicated on different carrier frequencies, and can be communicated at the same or different times. In full-duplex FDD (FD-FDD) outward and return signals are communicated at the same time, and in half-duplex FDD (HD-FDD), outward and return signals are communicated at different times.

Certain communication standards such as Long-Term Evolution (LTE) provide for both TDD and FDD modes of communication, with the FDD mode being either an FD-FDD mode or an HD-FDD mode. The HD-FDD mode has the potential benefit, under certain frequency arrangements, of being implemented without a duplex filter. For instance, a device implementing HD-FDD may use a switch to change between different frequency channels rather than using a duplex filter to maintain concurrent communication on two different frequency channels. The omission of a duplex filter may allow such a device to be implemented at relatively lower cost and with lower power consumption compared to devices that require a duplex filter. Accordingly, the use of HD-FDD may be particularly attractive for certain low-cost applications. The HD-FDD mode also has the potential benefit of allowing FDD frequency bands that could not otherwise be used due to too narrow of a duplex distance.

Some envisioned uses of the HD-FDD mode include various forms of machine type communication (MTC), for instance in the so-called internet-of-things (IoT). MTC communication generally involves communication between machines and other machines (e.g., machine-to-machine communication) and/or between machines and humans. Such communication may include, for example, the exchange of measurement data, control signals, and configuration information. The machines involved in MTC may be of various forms and sizes, ranging from wallet-sized devices to base stations, for example. In many such applications, MTC devices are deployed in large numbers, with each device operating in infrequent bursts. Accordingly, it may be beneficial to reduce the cost and/or power consumption of each device by omitting a duplex circuit and relying on HD-FDD communication.

In certain contexts, such as LTE based systems, HD-FDD communication may occur between one or more devices that support HD-FDD but not FD-FDD communication (hereafter, an "HD-FDD device"), and one or more other devices that support both HD-FDD and FD-FDD communication (hereafter, an "FD-FDD device"). In such contexts, a scheduler in an FD-FDD device (e.g., an eNodeB) may be required to consider data and control traffic in both directions when making scheduling decisions for an HD-FDD device (e.g., a low-cost MTC device). This requirement tends to add complexity to the scheduler. For example, when not in discontinuous receive mode (DRX), the HD-FDD device may continuously receive information through downlink physical channels except e.g., when required to transmit HARQ feedback.

An HD FDD UE typically monitors transmissions on the physical dedicated control channel (PDCCH) and/or the dedicated physical control channel (DPCCH) when it is not required to transmit. Such downlink transmissions can be triggered by scheduling by the eNB or other UL transmissions that are not actively scheduled by the eNB such as transmission of scheduling request (SR), periodic channel state information (CSI) or preamble transmission on the physical random access channel (PRACH).

3GPP standardizes two types of HD FDD, including Type A HD FDD and Type B HD FDD. Type A HD FDD has a guard time created by the UE by not receiving the last part (approximately 20 μs) of the DL subframe immediately preceding an UL subframe from the same UE. Type B HD FDD has a HD guard subframe by not receiving a DL subframe immediately preceding or following an UL subframe. A UE may also be classified as Type A HD TDD or Type B HD TDD based on a similar configuration of guard time or guard frame, respectively.

An eNB cannot schedule the HD UE as a FD UE since it needs to keep track of UL subframes and guard subframes.

HARQ timing applies to HD UEs. For example, transmitting an UL grant to a UE in a subframe at n=0 ("n" denotes a subframe number) requires an UL subframe at n=4. If this is the only UL scheduling, then subframes at n=3 and n=5 will be guard subframes for a HD type B UE. As a consequence, the UE will not monitor the PDCCH at n=4, n=5 and n=6 and the eNB must secure that no DL transmissions are done at these subframes. Transmitting an UL grant to a UE at n=0 and a DL assignment at n=1 will create UL subframes where the UE will not monitor at n=3 to n=6, where n=3 and 6 are guard frames. Transmitting a DL assignment at n=0 and n=2 will create UL subframes at n=4 to n=6 (the UE needs to be in UL mode at n=5 to be able to transmit data in n=4 and N=6) and guard subframes at n=3 and n=7.

Future subframes change from DL to UL or guard depending on scheduling decisions, and the scheduler needs to be aware of guard and UL subframes to be able to schedule the UE. Keeping track of the link on a per millisecond basis is called dynamic scheduling. The scheduling decision shall take into account 3GPP defined HARQ timing in both UL and DL as explained above.

SUMMARY

In some embodiments of the disclosed subject matter, a method at a network node comprises identifying a fixed periodic pattern to be used for scheduling a half-duplex (HD) user equipment (UE), the fixed periodic pattern defining a sequence of at least one downlink (DL) subframe, then at least one guard period, and then at least one uplink (UL) subframe, performing DL assignments for the network node according to the fixed periodic pattern, and transmitting UL grants to the UE according to the fixed periodic pattern.

In certain embodiments, the UE is a Type A UE, and the at least one guard period comprises a guard time within a DL subframe.

In certain embodiments, the UE is a Type B UE, and the at least one guard period comprises a guard subframe between a DL subframe and a UL subframe.

In certain embodiments, the fixed periodic pattern defines a sequence of seven consecutive subframes, including three DL subframes, then a guard subframe, and then three UL subframes.

In certain embodiments, the fixed periodic pattern defines a sequence of four UL subframes per sixteen subframes, wherein a Hybrid automatic repeat request (HARQ) process is to be performed during the four UL subframes.

In certain embodiments, the fixed periodic pattern is suitable for transmission time interval (TTI) bundling.

In certain embodiments, the fixed periodic pattern defines a sequence of twelve consecutive subframes, including a DL subframe followed by a guard subframe, then six UL subframes, then two guard subframes, and then two DL subframes.

In certain embodiments, the fixed periodic pattern is defined to be aligned with physical uplink control channel (PUCCH) resources based on a timing offset relative to a timing of the PUCCH resources. In some such embodiments, the PUCCH resources comprise scheduling request (SR) and channel state information (CSI) resources.

In certain embodiments, the UE is configured for HD frequency division duplexing (FDD) operation.

In some embodiments of the disclosed subject matter, a network node comprises at least one processor configured to identify a fixed periodic pattern to be used for scheduling a half-duplex (HD) user equipment (UE), the fixed periodic pattern defining a sequence of at least one downlink (DL) subframe, then at least one guard period, and then at least one uplink (UL) subframe, and perform DL assignments for the network node according to the fixed periodic pattern. The network node further comprises a transmitter configured to transmit UL grants to the UE according to the fixed periodic pattern.

In certain embodiments, the UE is a Type A UE, and the at least one guard period comprises a guard time within a DL subframe.

In certain embodiments, the UE is a Type B UE, and the at least one guard period comprises a guard subframe between a DL subframe and a UL subframe.

In certain embodiments, the fixed periodic pattern defines a sequence of seven consecutive subframes, including three DL subframes, then a guard subframe, and then three UL subframes.

In certain embodiments, the fixed periodic pattern defines a sequence of four UL subframes per sixteen subframes, wherein a Hybrid automatic repeat request (HARQ) process is to be performed during the four UL subframes.

In certain embodiments, the fixed periodic pattern is suitable for transmission time interval (TTI) bundling.

In certain embodiments, the fixed periodic pattern defines a sequence of twelve consecutive subframes, including a DL subframe followed by a guard subframe, then six UL subframes, then two guard subframes, and then two DL subframes.

In certain embodiments, the fixed periodic pattern is defined to be aligned with physical uplink control channel (PUCCH) resources based on a timing offset relative to a timing of the PUCCH resources. In some such embodiments, the PUCCH resources comprise scheduling request (SR) and channel state information (CSI) resources.

In certain embodiments, the UE is configured for HD frequency division duplexing (FDD) operation.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Certain embodiments are presented in recognition of shortcomings associated with conventional approaches, such as the following examples.

Dynamic scheduling for HD UEs can be described as a method that keeps track if the subframe is DL, UL or a guard subframe by updating the link of future subframes to be able to schedule the UE. This means that the scheduler determines the possibility for scheduling when the UE needs to be scheduled and updates future subframes. This approach has several problems.

First, it requires logic to determine if the future subframe or subframes where the UE is to be scheduled is UL, DL or guard subframe. Second, where the UL and DL are scheduled by separate logical entities communication between these entities is required. Third, the number of possible combinations of UL, DL and guard subframes due to scheduling decisions is large causing tedious test and verification. Fourth, because the number of such low complexity devices is likely to be in millions, dynamically scheduling each of these UEs by coordinating between the UL and DL will add more memory and processing costs.

In certain embodiments described below, a periodic subframe pattern is defined by UL, DL and guard subframes. A scheduler follows the pattern to determine whether a subframe is UL, DL or guard. The periodic pattern can be shifted in time to optimize it for possible UL transmissions for periodic CQI, SR and preambles.

Potential benefits of the described embodiments are that they may allow for simplicity which translates to reduced software development costs and reduced hardware requirements. For instance, it may be easier to follow a fixed periodic pattern rather than to determine future scheduling possibilities on TTI basis. This means that less processing and memory capacity is required, the software is simple and, easy to maintain and verify.

The described embodiments may be implemented in any appropriate type of communication system supporting any suitable communication standards and using any suitable components. As one example, certain embodiments may be implemented in an LTE network, such as that illustrated in FIG. 1.

Figure 1:
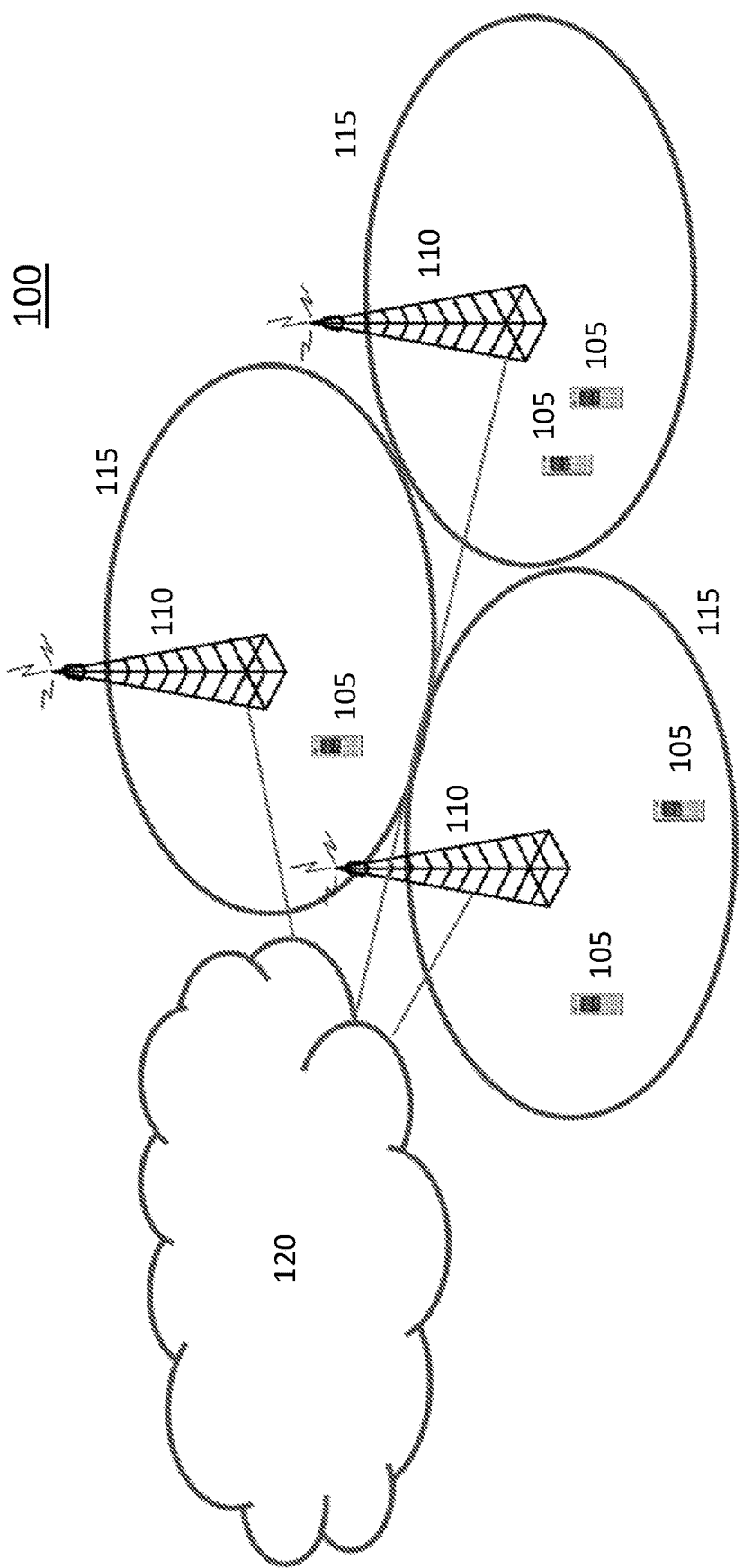
FIG. 1 is diagram illustrating a wireless communications network according to an embodiment of the disclosed subject matter.

FIG. 1 illustrates a communication network 100 according to an embodiment of the disclosed subject matter.

Referring to FIG. 1, a communication network 100 comprises a plurality of wireless communication devices 105 (e.g., UEs, machine type communication [MTC]/machine-to-machine [M2M] UEs, cellular radiotelephone—e.g., a smartphone, a feature phone; network adaptor or card, a modem or other such interface device, a tablet or laptop computer, or other device with wireless communication capabilities) and a plurality of radio access nodes 110 (e.g., eNodeBs or other base stations). Communication network 100 is organized into cells 115, which are connected to a core network 120 via corresponding radio access nodes 110. Radio access nodes 110 are capable of communicating with wireless communication devices 105 along with any additional features suitable to support communication between wireless communication devices or between a wireless communication device and another communication device (such as a landline telephone).

Figure 2A:
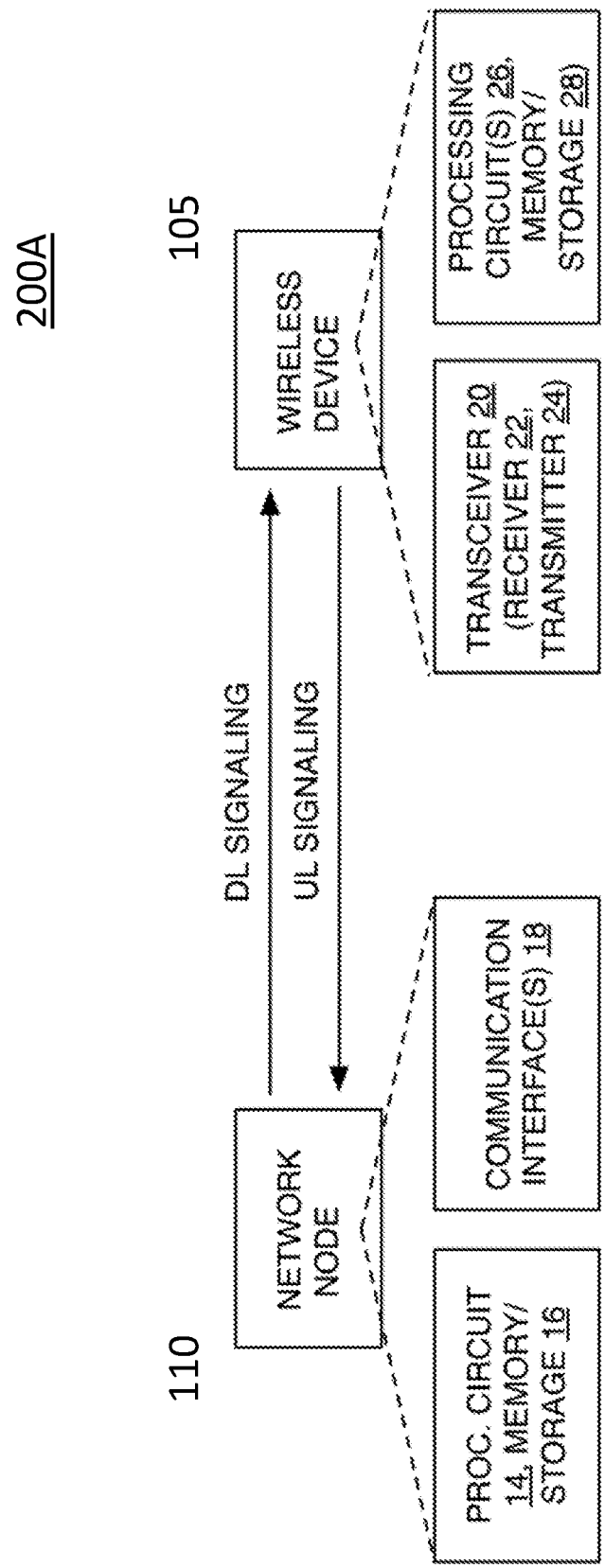
FIG. 2A is diagram illustrating a wireless communications network according to another embodiment of the disclosed subject matter.
Figure 2B:
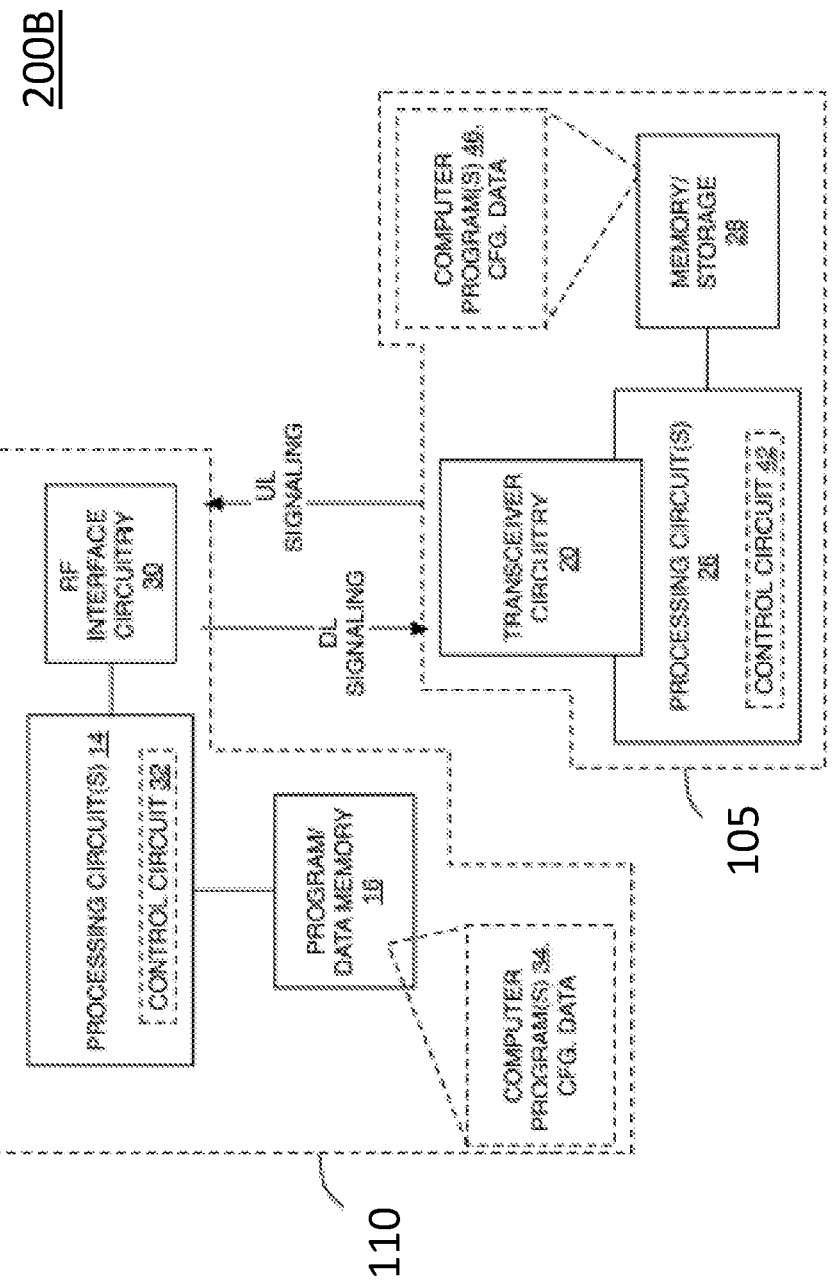
FIG. 2B is diagram illustrating a wireless communications network according to yet another embodiment of the disclosed subject matter.

Although wireless communication devices 105 may represent communication devices that include any suitable combination of hardware and/or software, these wireless communication devices may, in certain embodiments, represent devices such as those illustrated in greater detail by FIG. 2A or 2B. Similarly, although the illustrated radio access node may represent network nodes that include any suitable combination of hardware and/or software, these nodes may, in particular embodiments, represent devices such as the example radio access node illustrated in greater detail by FIG. 2A or 2B.

FIG. 2A illustrates a communication network 200A according to an embodiment of the disclosed subject matter. Communication network 200A represents one of many possible implementations of communication network 100.

Referring to FIG. 2A, communication network 200A comprises wireless communication device 105 and radio access node 110. In this embodiment, wireless communication device 105 comprises a transceiver 20 comprising a receiver 22 and a transmitter 24, a processing circuit 26, and memory/storage 28. Radio access node 110 comprises a processing circuit 14, memory/storage 16, and one or more communication interfaces 18. The illustrated features may represent functional and/or physical circuit arrangements, which may take the form of, e.g., digital processing circuits and associated memory or other computer-readable medium for storing configuration data, operational or working data, and for storing computer program instructions. In some embodiments, network-side and device-side functionality is realized at least in part through the programmatic configuration of digital processing circuitry, based on the execution by that circuitry of stored computer program instructions.

Memory/storage 16 and 28 may comprise, e.g., one or more types of computer-readable media, such as volatile, working memory and non-volatile configuration and program memory or storage. Communication interface 18 may be implemented according to the nature of radio access node 110. In a base station or other radio node example, communication interface 18 includes a radio transceiver, e.g., pools of radio transmission, reception, and processing circuitry, for communicating with any number of wireless communication devices 105 in any one or more cells of a wireless communication network. In such examples, communication interface 18 comprises one or more transmitters and receivers, e.g., cellular radio circuits, along with power control circuitry and associated signal-processing circuitry. Further, in the same scenario, communication interface 18 may include inter-base-station interfaces and/or backhaul or other Core Network, CN, communication interfaces.

FIG. 2B illustrates a communication network 200B according to an embodiment of the disclosed subject matter. Communication network 200B is a more detailed example of communication network 200A, in which processing circuit 14 comprises a control circuit 32, memory/storage 16 stores a computer program 34 and/or configuration data, communication interface 18 comprises RF interface circuitry 30, processing circuit 26 comprises a control circuit 42, and memory/storage 28 stores a computer program 46 and/or configuration data.

Some embodiments relate to partially standard-defined UEs and network nodes and/or to UEs and network nodes with proprietary capabilities. Partially standard-defined UEs and network nodes may refer to UEs and network nodes that do not completely follow standard specifications, e.g. 3GPP specifications. These UEs and network nodes may offer solutions and provide capabilities that are not provided in standard specifications. These capabilities may be referred to as non-standard compliant capabilities. Similarly, these UEs and network nodes may not offer all the solution or services presented in the standard specifications, and therefore only offer a limited amount of services or capabilities as compared to the standard specifications. UEs and eNB that do not fully follow standard specifications may be referred to as special UEs or special network nodes within this description.

FIGS. 3-7 illustrate various patterns of subframe assignments that can be used for scheduling a UE operating in HD mode. Certain patterns relate to Type A HD UEs, and certain patterns relate to Type B HD UEs. Additionally, certain patterns relate to UEs with normal HARQ operation, and certain patterns relate to UEs with TTI bundling (alternatively referred to as "subframe bundling").

The proposed periodic patterns define when a subframe of a certain kind occurs. The scheduler follows the pattern in time, scheduling according to the pattern. The scheduler only transmits DL assignments and/or UL grants on subframes that are defined as DL subframes by the pattern. The pattern is chosen to support HARQ timing requirements according to the standard: 4 TTIs after a DL assignment an UL subframes is defined for HARQ feedback for example as seen in FIG. 3.

Periodic patterns comprise three types of subframes: UL, DL and (in case of type B) guard frames. UL subframes can only be used for UL transmissions, DL subframes can only be used for DL subframes and guard subframes can't be used for UL or DL subframes.

Figure 3:
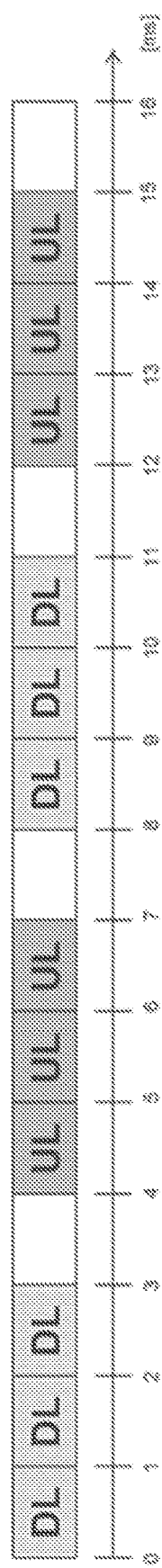
FIG. 3 illustrates a fixed periodic pattern for scheduling a Type B UE operating in HD FDD mode according to an embodiment of the disclosed subject matter.

FIG. 3 illustrates a fixed periodic pattern for scheduling a Type B UE operating in HD FDD mode according to an embodiment of the disclosed subject matter.

Referring to FIG. 3, the fixed periodic pattern comprises sequences of DL and UL subframes separated by guard subframes. The fixed periodic pattern is suitable for normal HARQ timing (not TTI Bundling) because a DL assignment requires a HARQ feedback in UL after 4 ms and an UL grant requires a PUSCH transmission after 4 ms.

Figure 4:
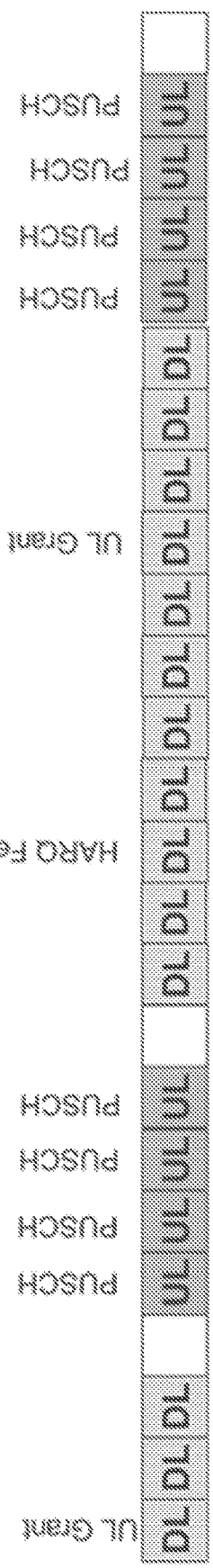
FIG. 4 illustrates fixed periodic pattern for scheduling a Type B UE operating in HD FDD mode with TTI bundling according to an embodiment of the disclosed subject matter.

FIG. 4 illustrates a fixed periodic pattern for scheduling a Type B UE operating in HD FDD mode and using TTI bundling according to an embodiment of the disclosed subject matter.

Referring to FIG. 4, the fixed periodic pattern can be used for TTI Bundling which has other HARQ timing than normal HARQ. The pattern allows one HARQ process, illustrated in FIG. 4 by a sequence of UL subframes labeled "PUSCH". Like full duplex operation, this HARQ process can be retransmitted every 16 ms using four UL subframes.

Figure 5:
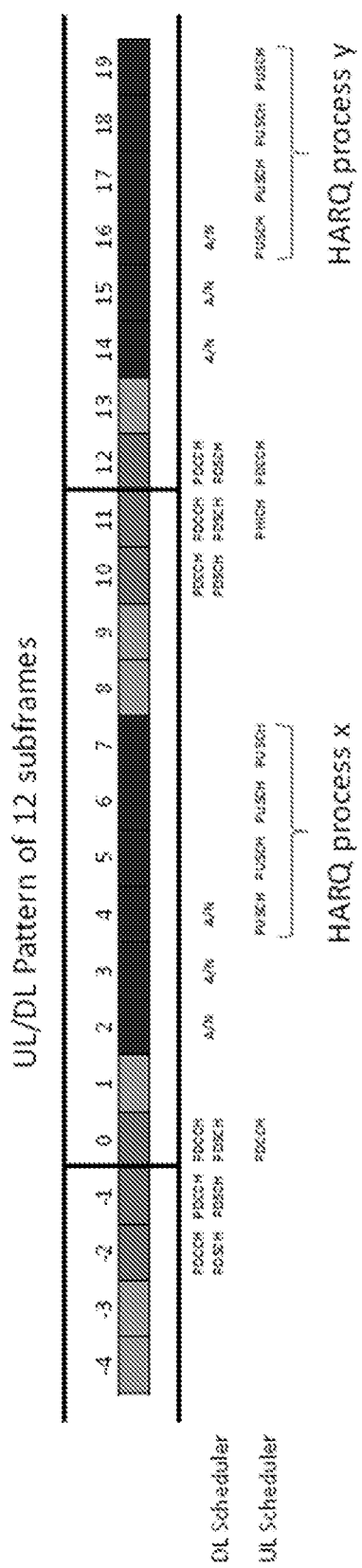
FIG. 5 illustrates a fixed periodic pattern for scheduling a Type B UE operating in HD FDD mode and using TTI bundling according to an embodiment of the disclosed subject matter.

FIG. 5 illustrates a fixed periodic pattern for scheduling a Type B UE operating in HD FDD mode and using TTI bundling according to an embodiment of the disclosed subject matter.

Referring to FIG. 5, the fixed periodic pattern is suitable for HD FDD Type B when TTI bundling is used. The pattern has a 12 TTI period. It allows for 1 HARQ process during this time, but the pattern cannot be retransmitted every 16 ms. Instead, it can be retransmitted every 48 ms. This pattern requires a specific, more robust, link adaptation to reduce the probability for retransmissions.

Figure 6:
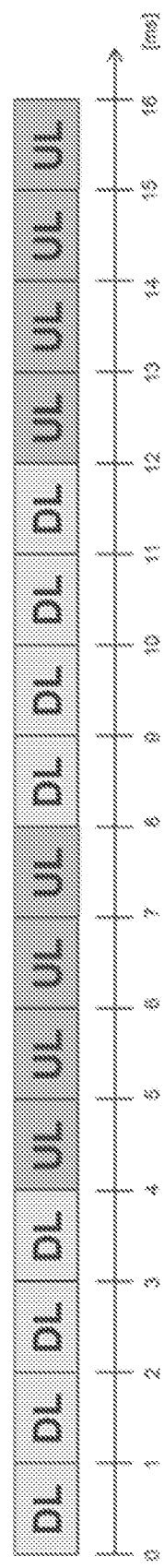
FIG. 6 illustrates fixed periodic pattern for scheduling a Type A UE operating in HD FDD mode according to an embodiment of the disclosed subject matter.

FIG. 6 illustrates fixed periodic pattern for scheduling a Type A UE operating in HD FDD mode according to an embodiment of the disclosed subject matter.

Referring to FIG. 6, the fixed periodic pattern is suitable for HD FDD Type A for normal HARQ operation or TTI bundling. It allows for four HARQ processes in case of normal HARQ transmissions and two HARQ processes for TTI Bundling.

Figure 7:
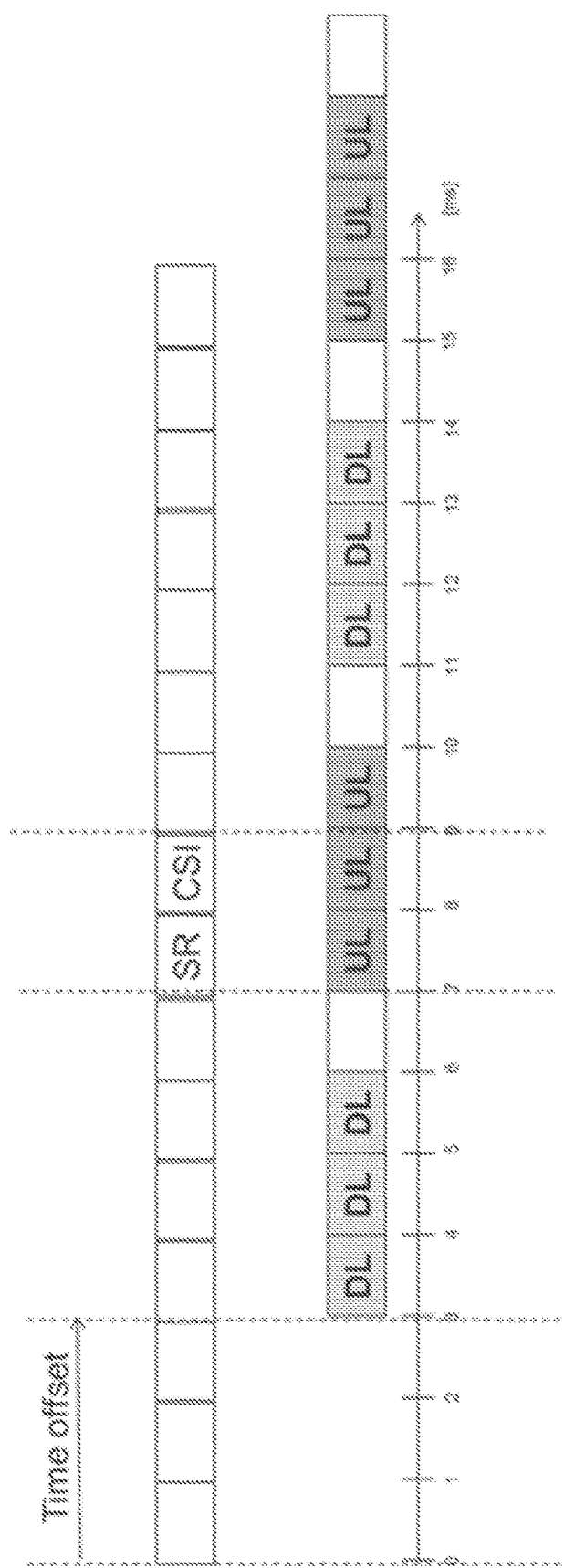
FIG. 7 shows an alignment between a fixed periodic pattern for scheduling a Type B UE operating in HD FDD mode, and PUCCH resources configured for SR and CSI according to an embodiment of the disclosed subject matter.

FIG. 7 shows an alignment between a fixed periodic pattern for scheduling a Type B UE operating in HD FDD mode, and PUCCH resources configured for SR and CSI according to an embodiment of the disclosed subject matter. The illustrated approach has several potential benefits, such as the following. First, UL transmissions on PUCCH for periodic CSI are never blocked due to DL or guard subframes. Second, in case the UE needs to transmit an SR or other non-periodic CSI information, this will never collide with DL transmissions. The UE will always monitor the PDCCH (subframes are DL subframes) unless it is scheduled to transmit in the UL or if it needs to do an UL transmission on PUCCH resources or on the PRACH channel. Third, a link specific load on hardware and an air interface is spread in time since the SR and CSI resources are spread in time.

Referring to FIG. 7, the fixed periodic pattern is aligned with CSI and SR resources using a time offset parameter. This parameter is relative to the timing of the CSI and SR. Correct alignment of patterns, combined with a 40 ms period (or modulo 40) for SR and CSI can completely avoid blocked CSI or SR. For other periods the alignment can be optimized to minimize the number of blocked CSI or SR.

Figure 8:
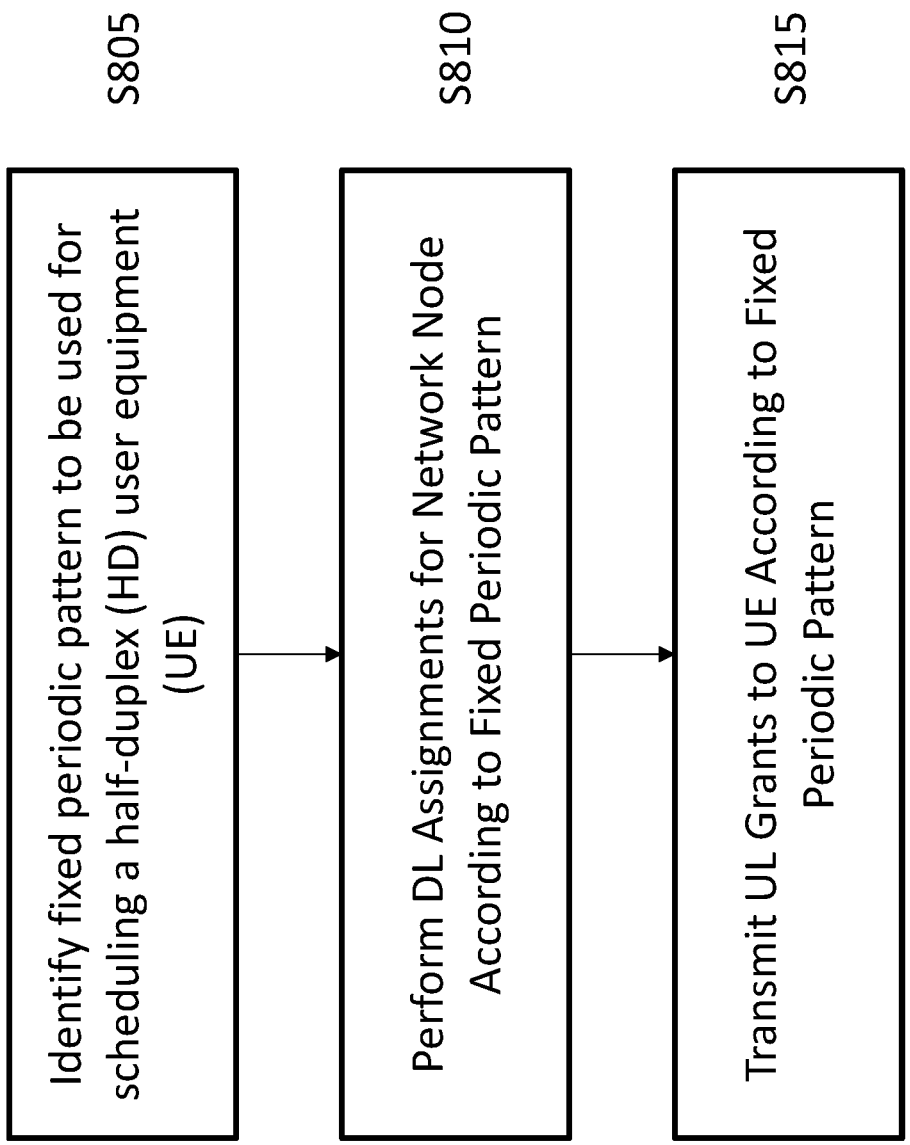
FIG. 8 is a flowchart illustrating a scheduling method to be performed at a network node according to an embodiment of the disclosed subject matter.

FIG. 8 is a flowchart illustrating a scheduling method to be performed at a network node according to an embodiment of the disclosed subject matter. The method of FIG. 8 could be performed in the context of a system such as that illustrated in any of FIGS. 1-2, for instance.

Referring to FIG. 8, the method comprises identifying a fixed periodic pattern to be used for scheduling a half-duplex (HD) user equipment (UE), the fixed periodic pattern defining a sequence of at least one downlink (DL) subframe, then at least one guard period, and then at least one uplink (UL) subframe (S805), performing DL assignments for the network node according to the fixed periodic pattern (S810), and transmitting UL grants to the UE according to the fixed periodic pattern (S815).

In certain embodiments, the UE is a Type A UE, and the at least one guard period comprises a guard time within a DL subframe. An example of such an embodiment is shown in FIG. 6.

In certain embodiments, the UE is a Type B UE, and the at least one guard period comprises a guard subframe between a DL subframe and a UL subframe. Examples of such embodiments are shown in FIGS. 3-5 and 7.

In certain embodiments, the fixed periodic pattern defines a sequence of seven consecutive subframes, including three DL subframes, then a guard subframe, and then three UL subframes. An example of such an embodiment is shown in FIG. 3.

In certain embodiments, the fixed periodic pattern defines a sequence of four UL subframes per sixteen subframes, wherein a Hybrid automatic repeat request (HARQ) process is to be performed during the four UL subframes. An example of such an embodiment is shown in FIG. 4.

In certain embodiments, the the fixed periodic pattern is suitable for transmission time interval (TTI) bundling. Examples of such embodiments are shown in FIGS. 4-5.

In certain embodiments, the fixed periodic pattern defines a sequence of twelve consecutive subframes, including a DL subframe followed by a guard subframe, then six UL subframes, then two guard subframes, and then two DL subframes. An example of such an embodiment is shown in FIG. 5.

In certain embodiments, the fixed periodic pattern is defined to be aligned with physical uplink control channel (PUCCH) resources based on a timing offset relative to a timing of the PUCCH resources. In some such embodiments, the PUCCH resources comprise scheduling request (SR) and channel state information (CSI) resources. An example of such an embodiment is shown in FIG. 7.

In certain embodiments, the UE is configured for HD frequency division duplexing (FDD) operation. Examples of such embodiments are shown in FIGS. 3-7.

Figure 9:
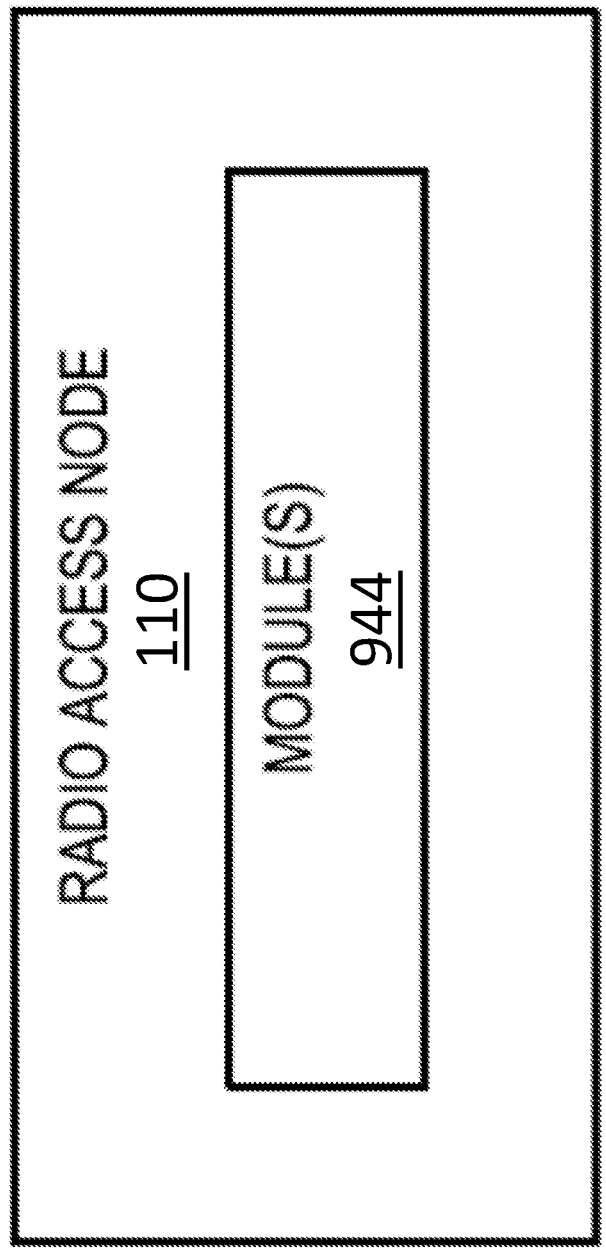
FIG. 9 is a block diagram of a radio access node according to an embodiment of the disclosed subject matter.

FIG. 9 is a block diagram of radio access node 110 according to some other embodiments of the disclosed subject matter. Radio access node 110 comprises one or more modules 1044, each of which can be implemented in software. Module(s) 1044 provide the functionality of radio access node 110 described herein. For example, module(s) 1044 may provide the functionality of the operations illustrated in FIG. 8.

In some embodiments, a radio access node 110 may be implemented with a virtualized architecture. As used herein, a "virtualized" radio access node 110 is an implementation of the radio access node 110 in which at least a portion of the functionality of radio access node 110 is implemented as a virtual component(s) (e.g., via a virtual machine(s) executing on a physical processing node(s) in a network(s)). For instance, the radio access node 110 may comprise a control system (optional) that comprises the one or more processors (e.g., CPUs, ASICs, FPGAs, and/or the like), memory, and a network interface, wherein one or more radio units each comprising one or more transmitters and one or more receivers is coupled to one or more antennas. The control system may be connected to radio unit(s) via, for example, an optical cable or the like. The control system may be connected to one or more processing nodes coupled to or included as part of a network(s) via the network interface, where each processing node comprises one or more processors (e.g., CPUs, ASICs, FPGAs, and/or the like), memory, and a network interface.

In some examples, functions of radio access node 110 may be implemented at the one or more processing nodes or distributed across the control system and the one or more processing nodes in any desired manner. In some examples, some or all of the functions of the radio access node may be implemented as virtual components executed by one or more virtual machines implemented in a virtual environment(s) hosted by the processing node(s). As will be appreciated by one of ordinary skill in the art, additional signaling or communication between the processing node(s) and the control system is used in order to carry out at least some of the desired functions. Notably, in some embodiments, the control system may not be included, in which case the radio unit(s) may communicate directly with the processing node (s) via an appropriate network interface(s).

Figure 10:
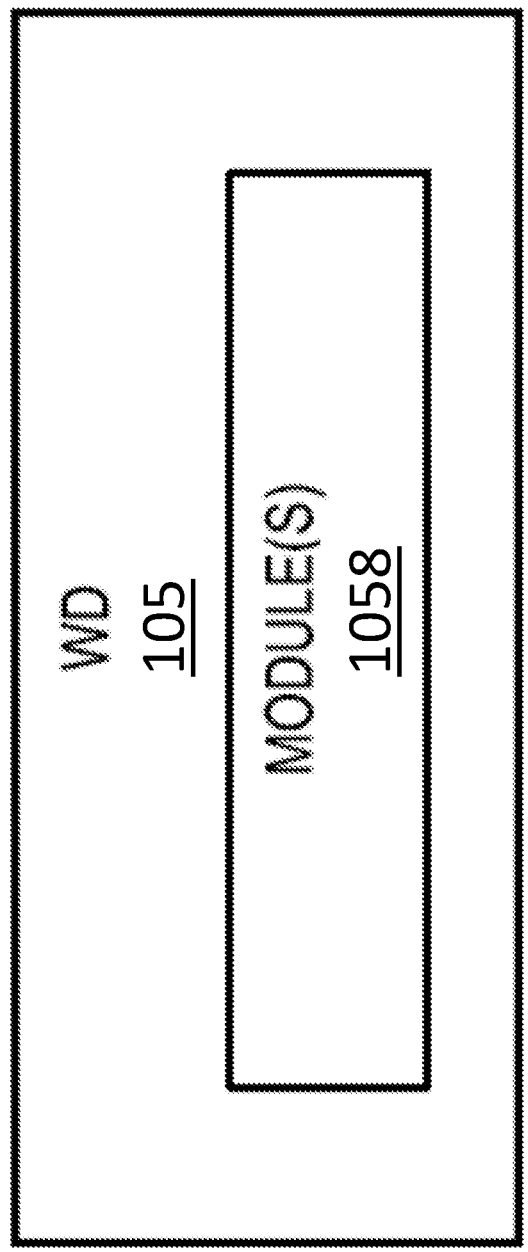
FIG. 10 is a block diagram of a wireless communication device according to an embodiment of the disclosed subject matter.

FIG. 10 is a block diagram of wireless communication device 105 according to some other embodiments of the disclosed subject matter. Wireless communication device 105 comprises one or more modules 1058, each of which is implemented in any suitable combination of hardware and/ or software. Module(s) 1058 provide the functionality of wireless communication device 105 described herein.

The terminology used herein is for the purpose of describing certain embodiments and is not intended to limit the disclosed subject matter. Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of this specification and the relevant art and will not be interpreted in an idealized or overly formal sense expressly so defined.

Where an element is referred to as being "connected", "coupled", "responsive", etc., to another feature, it can be directly connected, coupled, or responsive to the other feature, or intervening features may be present. In contrast, where a feature is referred to as being "directly connected", "directly coupled", "directly responsive", etc., to another feature, there are no intervening features present. Like numbers refer to like features throughout. Furthermore, "coupled", "connected", "responsive", etc., may include e.g. wirelessly coupled, connected, or responsive. As used herein, the singular forms "a", "an" and "the" are intended to include the plural forms as well, unless the context clearly indicates otherwise. Descriptions of known functions or constructions may be omitted for the sake of brevity and/or clarity. The term "and/or" includes any and all combinations of one or more of the associated listed items.

The terms first, second, third, etc. may be used herein to describe various features, but the described features should not be limited by these terms. Rather, these terms are used merely to distinguish one feature from another. Thus a first feature could be termed a second feature in alternative embodiments (or vice versa) without changing the meaning of the description.

As used herein, the terms "comprise", "comprising", "comprises", "include", "including", "includes", "have", "has", "having", or variants thereof are open-ended, and include one or more stated features but does not preclude the presence or addition of one or more other features. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Certain embodiments are described with reference to block diagrams and/or flowchart illustrations of computer-implemented methods, apparatus (systems and/or devices) and/or computer program products. A block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

In some alternate implementations, functions/acts noted in blocks may occur in an order different from that illustrated in the flowcharts. For example, two blocks shown in succession may be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of disclosed subject matter. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of disclosed subject matter.

While the disclosed subject matter has been presented above with reference to various embodiments, it will be understood that various changes in form and details may be made to the described embodiments without departing from the overall scope of the disclosed subject matter.

What is claimed:

1. A method at a network node, comprising:
   identifying a fixed periodic pattern to be used for scheduling a half-duplex user equipment, the fixed periodic pattern defining a sequence of at least one downlink subframe, then at least one guard period, and then at least one uplink subframe;
   performing downlink assignments for the network node according to the fixed periodic pattern; and
   transmitting uplink grants to the user equipment according to the fixed periodic pattern,
   wherein the fixed periodic pattern defines a sequence of twelve consecutive subframes, including a downlink subframe followed by a guard subframe, then six uplink subframes, then two guard subframes, and then two downlink subframes.

2. The method of claim 1, wherein the user equipment is a Type A user equipment, and the at least one guard period comprises a guard time within a downlink subframe.

3. The method of claim 1, wherein the user equipment is a Type B user equipment, and the at least one guard period comprises a guard subframe between a downlink subframe and an uplink subframe.

4. The method of claim 1, wherein the fixed periodic pattern is suitable for transmission time interval bundling.

5. The method of claim 1, wherein the fixed periodic pattern is defined to be aligned with physical uplink control channel resources based on a timing offset relative to a timing of the physical uplink control channel resources.

6. The method of claim 5, wherein the physical uplink control channel resources comprise scheduling request and channel state information resources.

7. The method of claim 1, wherein the user equipment is configured for half-duplex frequency division duplexing operation.

8. A network node, comprising:
   at least one processor configured to:
   identify a fixed periodic pattern to be used for scheduling a half-duplex user equipment, the fixed periodic pattern defining a sequence of at least one downlink subframe, then at least one guard period, and then at least one uplink subframe; and
   perform downlink assignments for the network node according to the fixed periodic pattern; and
   a transmitter configured to transmit uplink grants to the user equipment according to the fixed periodic pattern,
   wherein the fixed periodic pattern defines a sequence of twelve consecutive subframes, including a downlink subframe followed by a guard subframe, then six uplink subframes, then two guard subframes, and then two downlink subframes.

9. The network node of claim 8, wherein the user equipment is a Type A user equipment, and the at least one guard period comprises a guard time within a downlink subframe.

10. The network node of claim 8, wherein the user equipment is a Type B user equipment, and the at least one guard period comprises a guard subframe between a downlink subframe and an uplink subframe.

11. The network node of claim 8, wherein the fixed periodic pattern defines a sequence of seven consecutive subframes, including three downlink subframes, then a guard subframe, and then three uplink subframes.

12. The network node of claim 8, wherein the fixed periodic pattern is suitable for transmission time interval bundling.

13. The network node of claim 8, wherein the fixed periodic pattern is defined to be aligned with physical uplink control channel resources based on a timing offset relative to a timing of the physical uplink control channel resources.

14. The network node of claim 13, wherein the physical uplink control channel resources comprise scheduling request and channel state information resources.

15. The network node of claim 8, wherein the user equipment is configured for half-duplex frequency division duplexing operation.

* * * * *